United States Patent [19]

Flatau

[11] 3,976,206

[45] Aug. 24, 1976

[54] ARTICULATED MASTER SLAVE MANIPULATOR

[76] Inventor: Carl R. Flatau, 30 Dartmouth Road, Shoreham, N.Y. 11786

[22] Filed: July 16, 1975

[21] Appl. No.: 596,228

[52] U.S. Cl. ............................ 214/1 CM; 74/89.22; 74/96; 294/86 A
[51] Int. Cl.$^2$ .......................................... B25J 3/00
[58] Field of Search ............... 214/1 CM; 74/89.21, 74/89.22, 96; 294/86 A

[56] References Cited

UNITED STATES PATENTS

| | | | |
|---|---|---|---|
| 2,771,199 | 11/1956 | Jelatis | 214/1 CM |
| 2,774,488 | 12/1956 | Goertz et al. | 214/1 CM |
| 3,314,552 | 4/1967 | Vertut | 214/1 CM |
| 3,572,807 | 3/1971 | Haaker et al. | 214/1 CM |
| 3,664,517 | 5/1972 | Germond et al. | 214/1 CM |
| 3,790,002 | 2/1974 | Germond et al. | 214/1 CM |

FOREIGN PATENTS OR APPLICATIONS

| | | | |
|---|---|---|---|
| 1,394,029 | 1/1965 | France | 214/1 CM |
| 1,295,156 | 5/1969 | Germany | 294/86 A |

*Primary Examiner*—Robert S. Ward, Jr.
*Attorney, Agent, or Firm*—W. G. Fasse; W. W. Roberts

[57] ABSTRACT

An articulated master slave manipulator has a lower arm pivoted at a main idler pulley at one end of an upper arm, and a counter-balance mass pivoted at an idler pulley at the other end of the upper arm. A coupling system maintains the angle between the axis of the upper arm and the axes defined by the centers of gravity and the respective main pulleys of the counter-balance mass and the lower arm equal. A flexible, non-stretchable cable or so called tape extends from an actuator pulley on the counter-balance mass, around an auxiliary idler pulley on the counter-balance mass, thence around the main idler pulley and an auxiliary pulley on the lower arm to an output pulley on the lower arm. The actuating pulley, auxiliary pulleys, and output pulley are mounted to have a constant distance between their axes and the axes of the respective main idler pulleys.

9 Claims, 4 Drawing Figures

ARTICULATED MASTER SLAVE MANIPULATOR

BACKGROUND OF THE INVENTION

This invention relates to articulated master slave manipulators, and is particularly directed to manipulators of the type having counter-balance masses, with motor actuating means in the counter-balance masses for controlling the rotation of output pulleys in a lower arm.

A manipulator of this type is disclosed, for example, in U.S. Pat. No. 3,790,002, Germond et al. In the arrangement of this reference, the lower arm is pivoted to the upper arm at an axis on which idler pulleys are arranged, however, the counter-balance mass is pivoted to the upper arm about an axis displaced from the axis of the idler pulleys in the other end of the upper arm. In this reference the flexible tapes extending between the actuator in the counter-balance mass and the lower arm pass the upper sides of the two idler pulleys.

In the provision of a manipulator of this type, it is desirable to maintain the tape or cable extending between the actuator and the output pulley under uniform tension at all times, in order to assure the reversibility and accuracy of the transmission of motion between the actuator and the output pulley. It is further desirable to arrange the elements so that the counter-balance mass continually accurately counter-balances the lower arm. The arrangement of the above described Germond et al patent has not been found to attain these objectives in the mose desirable manner. Various other arrangements have been provided for controlling the rotation of an output pulley in a manipulator system. For example, such systems are shown in U.S. Pat. No. 2,774,488 (Goertz et al) and U.S. Pat. No. 3,572,807 (Haaker et al). In these arrangements, as in the above mentioned Germond et al patent, the flexible cable or tape also extends over the tops of the two main idler pulleys in the upper arm, and the pivotal axes of at least one of the arms affixed to the upper arm is not positioned at the respective main idler pulley. As a consequence, such arrangements also have the disadvantages of the above discussed Germond et al patent. Similarly, U.S. Pat. No. 3,314,552 (Vertut) and U.S. Pat. No. 3,664,517 (Germond et al) also disclose manipulator systems in which the flexible cable or tape extends over the tops of the main idler pulleys. A number of the above systems have the further disadvantage that their usefulness is reduced in the provision of a large number of idler pulleys, and in the provision of relatively complex control systems.

OBJECTS OF THE INVENTION

In view of the above, it is the aim of the invention to achieve the following objects singly or in combination:

to provide an improved master-slave manipulator that overcomes the above disadvantages of prior art manipulators, especially to provide a highly reversible motor driven manipulator the angular motion range of which is substantially increased, and to provide a simply manufactured master-slave manipulator having a lower arm and a counter-balance mass pivotally mounted on opposite ends of an upper arm with an actuator pulley in the counter-balance mass and an output pulley in the lower arm and a non-extensible flexible cable extending between the actuator and the output pulley by way of the upper arm.

SUMMARY OF THE INVENTION

In order to achieve the above objects, a master-slave manipulator is provided having a pair of main idler pulleys independently rotatably mounted at each end of the upper arm of the assembly. A counter-balance mass is pivotally mounted at one end of the upper arm, at the axis of rotation of the main idler pulleys at that end of the upper arm, and a lower arm is pivotally mounted at the other end of the upper arm at the axis of rotation of the main idler pulleys at said other end of the upper arm.

A pair of independently rotatable auxiliary idler pulleys are mounted in the counter-balance mass, for rotation of an xis parallel to the corresponding main idler pulleys, and an actuator pulley assembly is also rotatably mounted in a counter-balance mass. A second pair of independently rotatable auxiliary idler pulleys are mounted for rotation in the lower arm, about an axis parallel to the corresponding main idler pulleys, and an output pulley assembly is also pivotally mounted in the lower arm.

A non-extensible flexible transmission means, such as a cable, is provided for transmitting rotation of the actuator pulley assembly to rotation of the output pulley assembly. The cable, which may comprise a pair of cables affixed to the actuator pulley assembly and to the output pulley assembly extends from the actuator pulley assembly around the corresponding auxiliary idler pulleys in one rotational sense, thence around the corresponding main idler pulley in the opposite rotational sense, thence around the other main idler pulleys in the opposite rotational sense, and thence around the auxiliary idler pulleys in the lower arm in the first rotational sense to the output pulley assembly. The two cables are, of course, wrapped in opposite directions around each of the actuator and output pulley assemblies. The cables extend between the two main idler pulleys on the underside thereof.

In addition, means are provided for insuring that the axis defined by the center of gravity of the lower arm and the rotational axis thereof is maintained parallel with the axis defined by the center of gravity of the counter-balance mass and the axis of rotation thereof.

With this arrangement, since a parallel relationship is maintained between the axis extending through the center of gravity of the lower arm and the axis extending through the center of gravity of the counter-balance mass, the assembly is perfectly balanced, even though the upper or the lower arm is rotated. In addition, the looping angles around the main idler pulleys are controlled so that with respect to either cable, the sum of the looping angles around the two respective main idler pulleys is constant. In the arrangement in accordance with the invention, there is a light low friction transmission between a motor in the counter-balance mass for controlling the rotation of the actuator pulleys, and the motions of the lower arm. In addition, the locations of the idlers assures a wide possible range of angular motions, which is limited only by contact between the lower arm or counter-balance mass and the upper arm, contact between the auxiliary pulleys and the stretch of tape between the main pulleys, or by the cable lifts of the main guide pulleys. The arrangement in accordance with the invention thus provides a highly reversible transmission between the motor and the output pulley, and since the cable is under tension, accurate control is continually assured.

BRIEF FIGURE DESCRIPTION

In order that the invention will be more clearly understood, it will now be described by way of example, with reference to the accompanying drawings, wherein.

DETAILED DESCRIPTION OF EXAMPLE EMBODIMENTS

Figure 1:
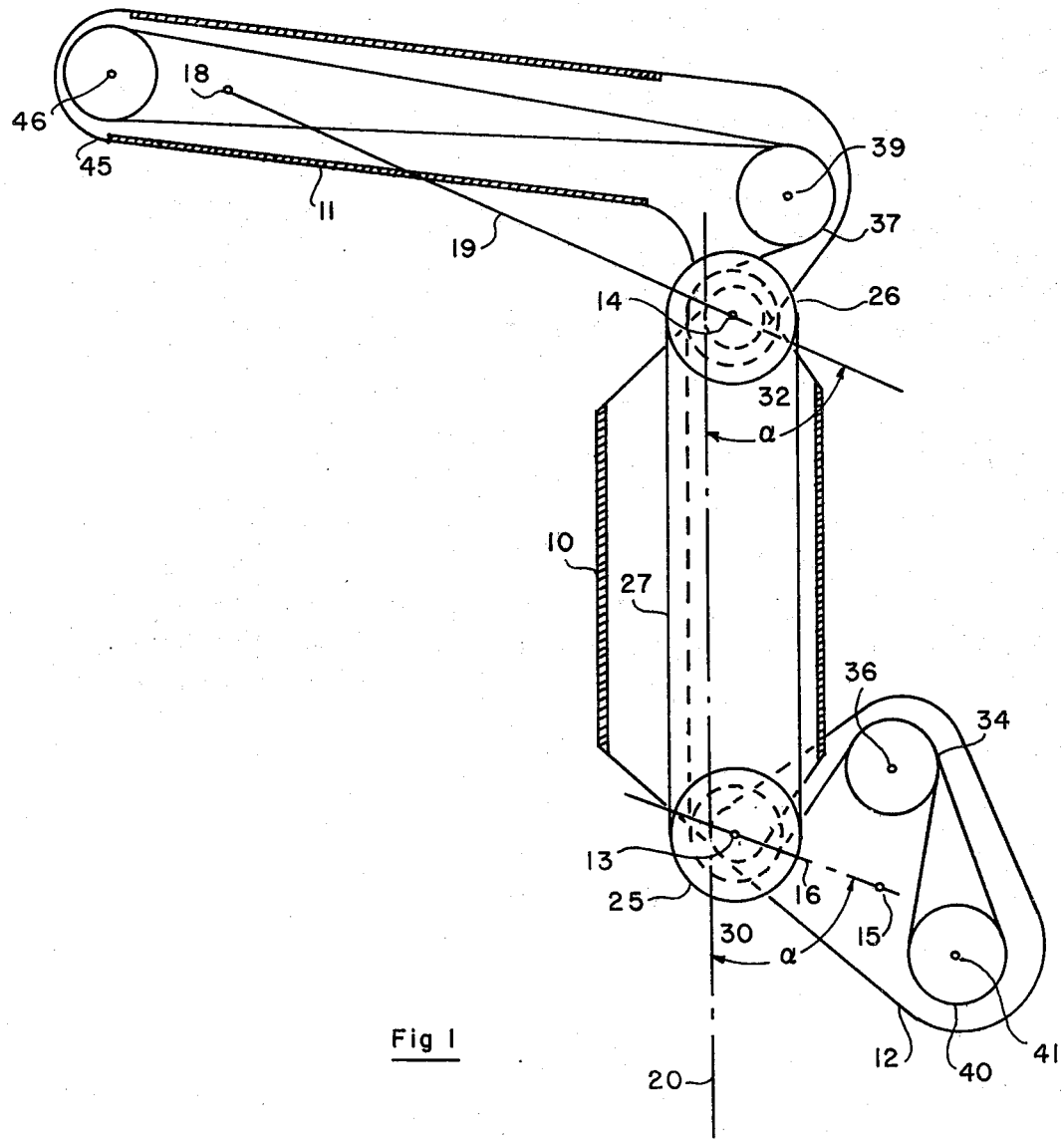
FIG. 1 is a simplified partially cross sectional view of a master-slave manipulator in accordance with one embodiment of the invention.

FIG. 1 illustrates a simplified partially cross sectional view of a manipulator in accordance with the invention. The manipulator comprises an upper arm 10, a lower arm 11, and a counter-balance mass 12. The upper arm 10 may be mounted in a conventional manner.

The counter-balance mass 12 is pivotally mounted to the upper arm at an axis 13, and the lower arm 11 is pivotally mounted to the other end of the upper arm 10 at an axis 14. The axis 13 and the center of gravity point 15 of the counter-balance mass define an axis 16, and the center of gravity 18 of the lower arm 11 and the axis 14 define an axis 19. In accordance with the invention, in order to maintain the assembly completely balanced at all times, means are provided for insuring that the axis 19 remains parallel to the axis 16, so that an identical angle $\alpha$ is continuously provided between these axes and the center axis 20 of the upper arm. While the axis 20 of the upper arm is illustrated as displaced from the axes 14 and 13, it is to be noted that the axis 20 may be defined by the axes 13 and 14.

FIG. 1 illustrates a pulley 25 at the axis 13 and a pulley 26 at the axis 14. These pulleys are affixed to the counter-balance mass 12 and the lower arm 11 respectively, and a flexible cable 27 or the like extends around the pulleys 25 and 26. The flexible cable 27 is preferably affixed to each of the pulleys 25 and 26 at one point, whereby the axis 16 and the axis 19 will be continually maintained parallel to each other.

Figure 2:
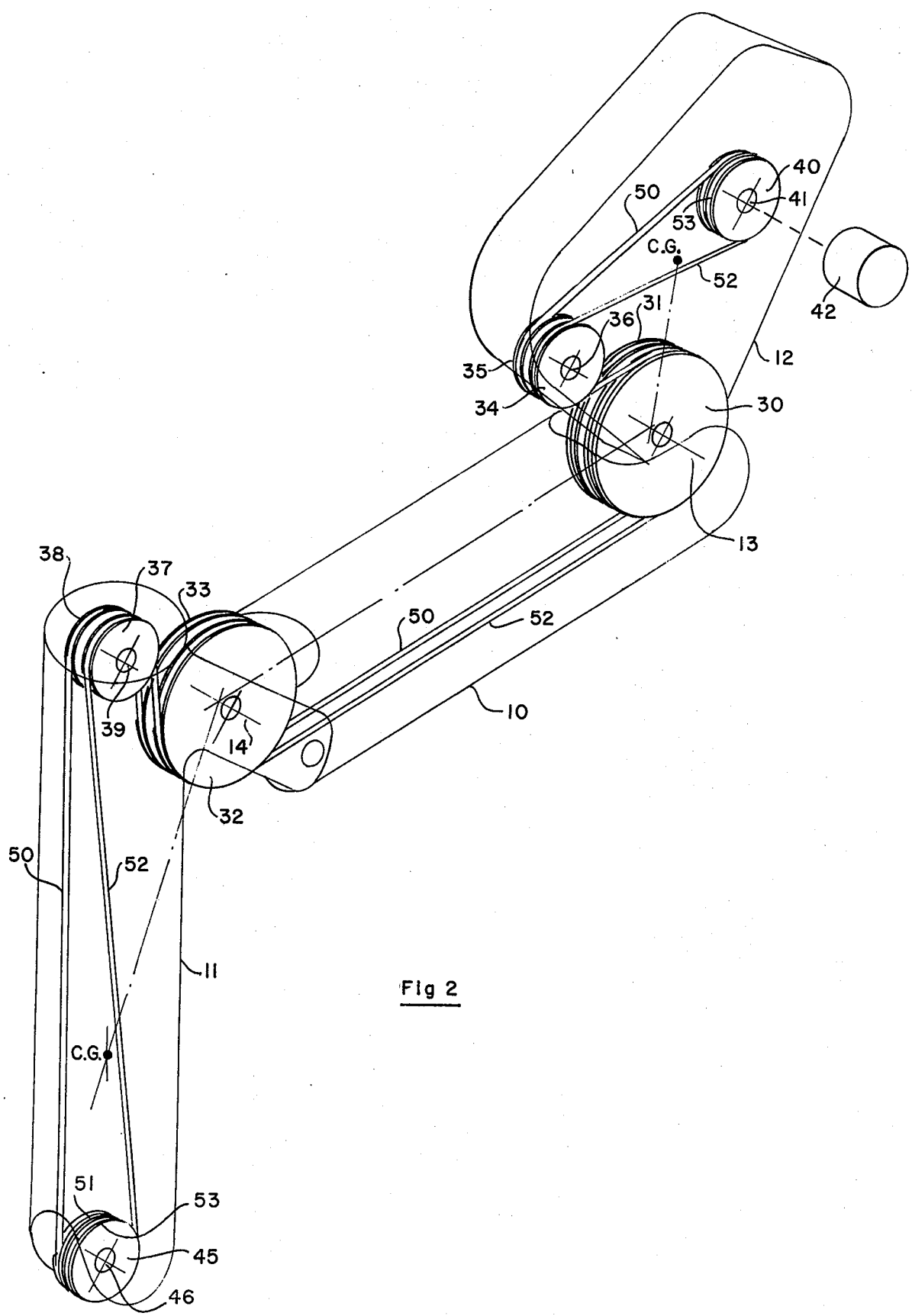
FIG. 2 is a perspective view of the cable and pulley assembly of the arrangement of FIG. 1 with the arms and counter-balance mass being illustrated in phantom.

A pair of idler pulleys 30 and 31 is mounted for independent rotation on the axis 13, as is more clearly illustrated in FIG. 2, and similarly a pair of main idler pulleys 32 and 33 is mounted for independent rotation on the axis 14. The main idler pulleys 30 to 33 all have the same diameter. A pair of auxiliary idler pulleys 34 and 35 are mounted for independent rotation in the counter-balance mass, for rotation about an axis 36 parallel to the axis 13. Similarly, a pair of auxiliary idler pulleys 37 and 38 is mounted in the lower arm 11 for independent rotation about an axis 39 parallel to the axis 14. The axis 36 of the auxiliary pulleys 34 and 35 is to one side of the axis 13, and is displaced from the axis 13 in one direction from the axis 14. similarly, the axis 39 of the pulleys 37 and 38 is on the same side of the axis 14. The axis 39, however, is preferably oppositely directed from the axis 14. An actuator pulley 40 is also mounted for rotation in the counter-balance mass 12, and this pulley may comprise a pair of pulleys, if desired, fixed for rotation together about an axis 41. The pulley 40 may be driven by an actuator motor 42, also mounted on the counter-balance mass 12. The motor 42 may, for example, be a reversible d.c. motor.

An output pulley 45, which may also comprise conveniently a pair of fixed together pulleys, is mounted for rotation at the end of the lower arm 11, at an axis 46. The pulley 45 may be adapted to control a desired output movement of the manipulator, in accordance with conventional practice.

In the arrangement illustrated in FIGS. 1 and 2, the axis 41 of the pulley 40 is displaced from the axis 13 in the direction away from the axis 14 and is also preferably to one side of the axis 13. A first non-extensible flexible tape or cable 50 is affixed to the pulley 40 by conventional means (not shown) and extends counter-clockwise therearound to extend from one portion of this pulley to a similiar side of the auxiliary pulley 35. The cable 50 thence extends counter-clockwise around the auxiliary pulley 35, leaving the opposite side of the pulley 35 and engaging the top of the pulley 31. The cable 50 thence extends clockwise around the main idler pulley 31 and extends from the bottom of the pulley 31 through the upper arm 10 to the bottom of the pulley 33. The cable thence extends clockwise around the main idler pulley 33, leaving this pulley at the side adjacent to pulley 38, and extends and around the auxiliary idler pulley 38 in a counter-clockwise direction. The cable 50 thus extends to the pulley 45 and is wrapped counter-clockwise therearound and has its end fixed therein, as illustrated at the numeral 51. A further non-extensible, flexible tape 52 is affixed to the pulley 40 as illustrated at reference numeral 53, the cable 52 extending clockwise around the pulley 40 and thus extending from opposite side of the pulley 40 to the first side of the auxiliary idler pulley 34. The cable 52 extends counter-clockwise around the auxiliary idler pulley 34, thence to the top of the pulley 30, and clockwise around the pulley 30. The cable 52 thence extends from the bottom of the pulley 30 to the bottom of the idler pulley 32, extending clockwise around the pulley 32 and thence counter-clockwise around the auxiliary idler pulley 37. The cable 52 then extends to the pulley 45, extending clockwise around the pulley 45 and being affixed thereto as illustrated at the numeral 53.

In the above courses of the cables 50 and 52, it is apparent that the cables extend in one rotational sense around the main idler pulleys 30 to 33, the long stretch of the cables between the main idler pulleys being at the bottoms of these pulleys, and that both of the cables also extend around the respective auxiliary idler pulleys in the opposite rotational sense.

In the above described arrangement in accordance with the invention, since the lower arm 11 is controlled so that the axis 19 is continually parallel to the axis 16, it is apparent that, in addition to maintaining continually the balance of the assembly, the flexible tape or cable is also not stressed. Thus, for example, referring to FIG. 1, if the counter-balance mass is rotated clockwise about the axis 13, the looping angle of the tapes about the main pulleys 30 and 31 will decrease, but the looping angle around the pulleys 32 and 33 will increase by a corresponding amount. This arrangement is made possible by the fact that the rotational axes 36 and 39 of the auxiliary idler pulleys are at a constant fixed distance from the rotational axes 13 and 14 respectively, and similarly the axis 41 of the actuator pulley and the axis 46 of the output pulley are also maintained at a fixed distance from the axes 13 and 14 respectively. Thus, in the arrangement in accordance with the invention, the movement of the lower arm does not effect any stresses in the cables, and the provision of means for controlling the tensions of the cables is not necessary. Further, by providing the auxiliary idler pulleys to direct the cables to their respective main idler pulleys, and by extending the cables between the main idler pulleys from the bottoms of these pulleys, it has been found that a completely accurate reversible transmission of motion is attainable.

In addition, in the above described arrangement in accordance with the invention, the dimensions of the lower arm and counter-balance mass may be readily designed and selected in order to insure that the system is continuously balanced, even upon rotation of the upper arm 10 or the lower arm 11.

It is further to be noted that, in view of the provision of means for maintaining the axes 19 and 16 parallel, the sum of the looping angles of the cables about the main idler pulleys at the two ends of the upper arm is constant.

The arrangement in accordance with the invention is thus very accurate, and the control is highly reversible. No external rods, cables, or gears are required. The output pulley 45 may be rotated in a range of up to 270° in response to the rotation of the actuator pulley 40, in order to provide a very wide range of control for the output of the device. The cables 50 and 52 are, of course, under tension, in order to insure the accurate reversible control.

While the arrangement of FIGS. 1 and 2 has been illustrated to show means for controlling a single output function, in response to the use of a single motor, it is apparent that one or more additional motors may be provided on the counter-balance mass, and connected with similarly arranged actuator, auxiliary idler, main idler, and output pulleys to effect the control of different output functions, in accordance with conventional practice. It is thus apparent that such additional main idler pulleys are mounted for rotation about the axes 13 and 14, and that the main idler pulleys for any control function must have the same size. The rotational axes of the auxiliary idler pulleys are preferably, although not necessarily on the axes 36 and 39. It is to be noted that, while it is preferable that the auxiliary idler pulleys have the same diameter, this is not an absolute necessity, since the idler pulleys serve primarily to direct the cables to and from their respective main idler pulleys in the desired direction.

The arrangement in accordance with the invention has a lower inertia than prior master-slave manipulators.

Figure 3:
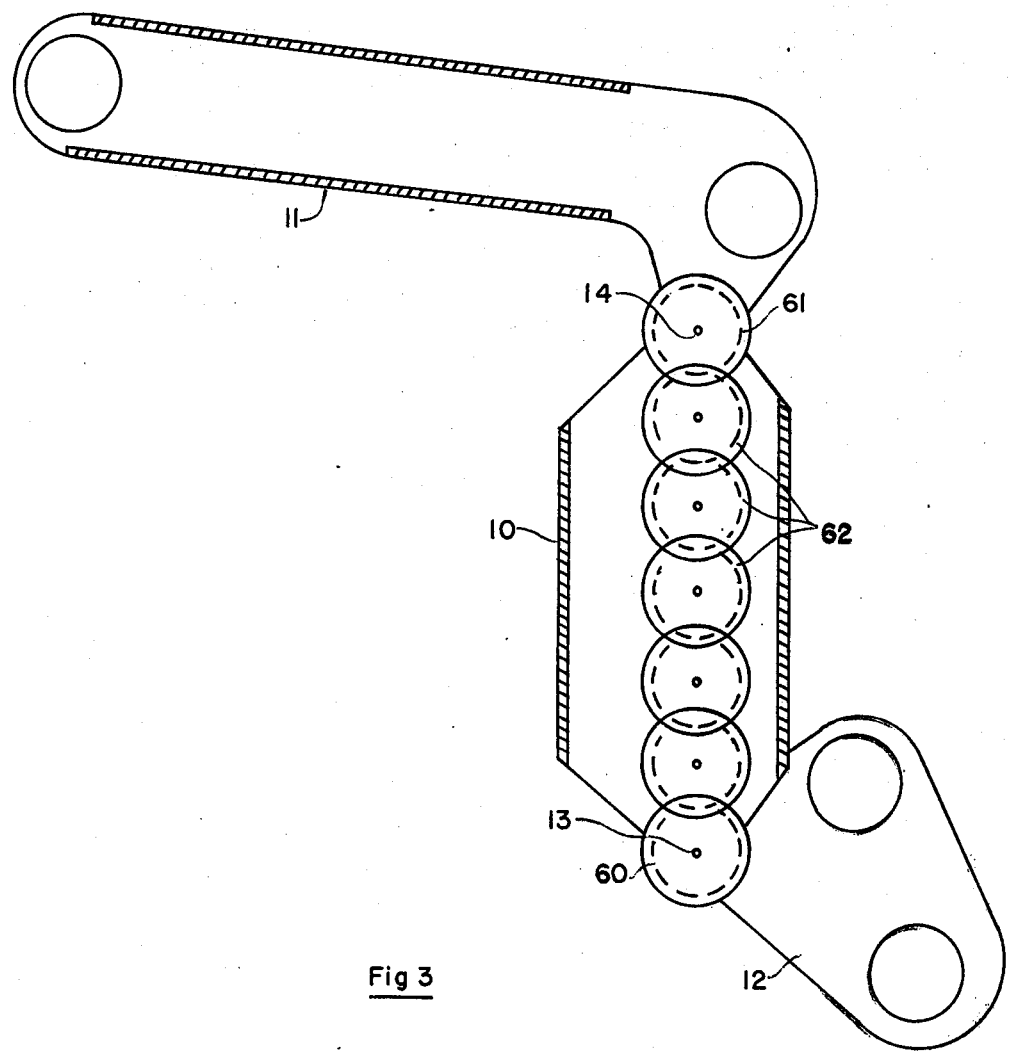
FIG. 3 is a simplified illustration of a modification of a portion of the arrangement of FIG. 1.

While it is preferred that the parallel relationship between the axes 16 and 19 be maintained by employing a cable or tape drive, as illustrated in FIG. 1, further arrangements are also possible for this purpose. Thus, as illustrated in FIG. 3, a gear 60 is affixed to the counter-balance mass 12 at the axis 13, and a gear 61 is affixed to the lower arm 11 at the axis 14. A series of gears 62 are provided within the upper arm 10, to translate rotation of the counter-balance mass 12 to equal rotation of the lower arm 11. It is, of course, apparent that an odd number of such gears 62 is required for this purpose.

Figure 4:
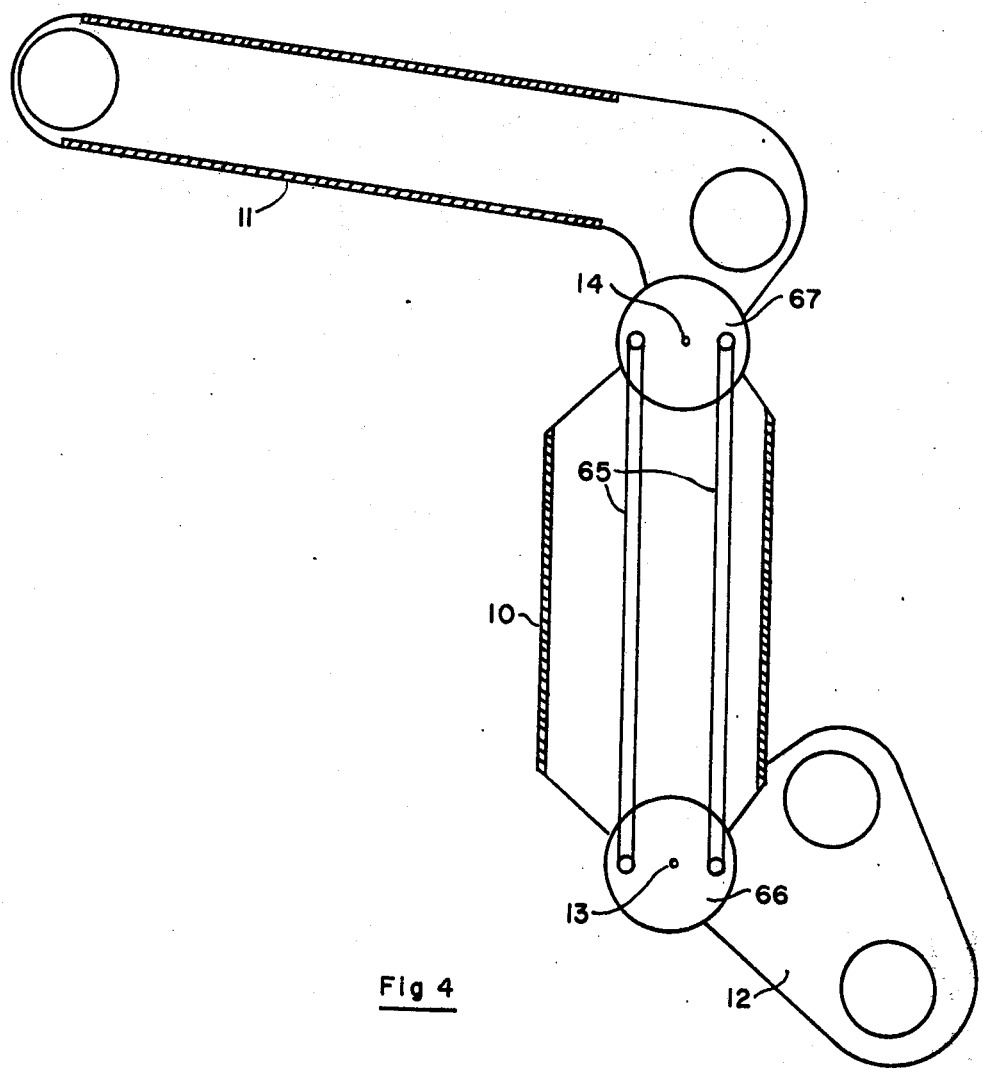
FIG. 4 is a simplified illustration of a further modification of a portion of the arrangement of FIG. 1.

In a still further arrangement, as illustrated in FIG. 4, a pair of rods 65 are provided extending through the upper arm 10, the arms being pivotally affixed to the counter-balance mass 12 and lower arm 11 at opposite sides of the axes 13 and 14 respectively, to form a parallelogram structure for insuring rotation of the lower arm 12 about the axis 14 with equal angular rotation of the counter-balance mass 12 about the axis 13. If desired, the rod 65 may be pivotally affixed to wheels 66 and 67, which are in turn affixed to the counter-balance mass 12 and lower arm 11 respectively.

In view of the foregoing disclosure it will be appreciated that the range of angular motion of the present manipulator is substantially increased as compared to the prior art, because the angular motion is limited only by the following factors, that the lower arm or the balance mass contacts the upper arm, or that the tape is lifted off the main guide pulley, or that the back of the auxiliary pulley contacts the tape between the main guide pulleys. For all practical purposes, these limiting factors are not significant.

Although the invention has been described with reference to specific example embodiments, it is to be understood, that it is intended to cover all modifications and equivalents within the scope of the appended claims.

What is claimed is:

1. In a master-slave manipulator of the type having an upper arm, a lower arm, and a counter-balance mass pivoted at opposite ends of the upper arm, an actuator pulley assembly in the counter-balance mass, an output pulley assembly in the lower arm, and flexible transmission means extending from the actuator pulley assembly to the output pulley assembly; the improvement comprising a pair of first independently rotatable main idler pulleys mounted for rotation about a first axis at one end of the upper arm, a pair of second independently rotatable main idler pulleys mounted for rotation about a second axis at the other end of said upper arm, said main idler pulleys having equal diameters, said counter-balance mass and lower arm being pivotally mounted for rotation about said first and second axes respectively, a pair of first auxiliary idler pulleys mounted in said counter-balance mass for rotation about an axis parallel to said first axis, a pair of second auxiliary idler pulleys mounted in said lower arm for rotation about an axis parallel to said second axis, and means for maintaining a third axis defined by the center of gravity of said counter-balance mass and said first axis parallel to a fourth axis defined by the center of gravity of said lower arm and said second axis, said flexible transmission means extending from said actuator pulley assembly around said first auxiliary idler pulleys in a first rotational sense, thence around said first and second main idler pulleys in that order in a second rotational sense opposite said first rotational sense, thence around said second idler pulleys in said first rotational sense, and thence to said output pulley assembly.

2. The master-slave manipulator of claim 1, wherein said flexible transmission means extends in said upper arm between the bottoms of said first and second main idler pulleys.

3. The master-slave manipulator of claim 1, wherein the axes of said first auxiliary idler pulleys are to one side of said first axis, the axes of said second auxiliary idler pulleys are to the same side said second axis, and wherein said flexible transmission means extends between the bottoms of said main idler pulleys in said upper arm.

4. The master-slave manipulator of claim 3, wherein said flexible transmission means comprises first and second flexible cables, said actuator pulley assembly comprising first and second fixed together actuator pulleys, and said output pulley assembly comprising first and second fixed together output pulleys, said first cable being fixed to said first actuator pulley and extending counter-clockwise around said first actuator pulley, counter-clockwise around one of said first auxiliary idler pulleys, clockwise around one of said first main idler pulleys, clockwise around one of said second main pulleys, counter-clockwise around one of said second auxiliary idler pulleys, and counter-clockwise around said first output pulley, and being affixed to said first output pulley, said second cable extending clockwise around the other of said actuator pulleys, counter-clockwise around the other of said first auxiliary idler pulleys, clockwise around the other of said first main idler pulleys, clockwise around the other of said second main idler pulleys, counter-clockwise around the other of said second auxiliary idler pulleys, and clockwise around said second output pulley and being affixed to said second output pulley.

5. The master-slave manipulator of claim 1, wherein said means for maintaining said third axis parallel to said fourth axis comprises a first pulley means affixed to said counter-balance mass at said first axis, a second pulley means affixed to said lower arm at said second axis, and flexible drive means extending between said first and second pulley means in said upper arm.

6. The master-slave manipulator of claim 1, wherein said means for maintaining said third and fourth axes parallel comprises a first gear affixed to said counter-balance mass at said first axis, a second gear affixed to said lower arm at said second axis, and a series of an odd number of gears coupled between said first and second gears in said upper arm.

7. The master-slave manipulator of claim 1, wherein said means for maintaining said third axis parallel to said fourth axis comprises a pair of rods extending through said upper arm and pivotally affixed to said counter-balance mass and said lower arm at positions on opposite sides of said first and second axes respectively, to form a parallelogram.

8. The master-slave manipulator of claim 1, further comprising motor means mounted on said counter-balance mass to control the rotation of said actuator pulley assembly.

9. The master-slave manipulator of claim 1, wherein the axes of said actuator pulley assembly and said first auxiliary idler pulleys are at constant fixed distances from said first axis, and wherein the axes of said output pulley assembly and said second auxiliary idler pulleys are at constant fixed distances from said second axis.

* * * * *